US012693248B2

(12) United States Patent
Furuhashi

(10) Patent No.: US 12,693,248 B2
(45) Date of Patent: Jul. 28, 2026

(54) SURFACE ANALYSIS METHOD AND SURFACE ANALYSIS APPARATUS

(71) Applicant: SHIMADZU CORPORATION, Kyoto (JP)

(72) Inventor: Osamu Furuhashi, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 260 days.

(21) Appl. No.: 18/713,522

(22) PCT Filed: May 31, 2022

(86) PCT No.: PCT/JP2022/022132
§ 371 (c)(1),
(2) Date: May 24, 2024

(87) PCT Pub. No.: WO2023/095365
PCT Pub. Date: Jun. 1, 2023

(65) Prior Publication Data
US 2025/0020603 A1      Jan. 16, 2025

(30) Foreign Application Priority Data

Nov. 25, 2021      (JP) ................................. 2021-190896

(51) Int. Cl.
*G01N 23/2257* (2018.01)
*H01J 49/00* (2006.01)
*H01J 49/04* (2006.01)
(52) U.S. Cl.
CPC ...... *G01N 23/2257* (2013.01); *H01J 49/0031* (2013.01); *H01J 49/0459* (2013.01)
(58) Field of Classification Search
CPC ................................................. G01N 23/2257
See application file for complete search history.

(56) References Cited

U.S. PATENT DOCUMENTS

2009/0321634 A1* 12/2009 Khursheed ............ H01J 49/142
250/311
2011/0147578 A1* 6/2011 Schultz ............... H01J 49/0004
250/288
2018/0025897 A1 1/2018 Reed et al.

FOREIGN PATENT DOCUMENTS

JP    2008-021504 A    1/2008
JP    2020-202379 A    12/2020

OTHER PUBLICATIONS

First Office Action dated Jun. 10, 2025 issued for the corresponding Japanese Patent Application No. 2023-563505.
(Continued)

*Primary Examiner* — Edwin C Gunberg
(74) *Attorney, Agent, or Firm* — Muir Patent Law, PLLC

(57) ABSTRACT

A surface analysis apparatus includes: an ion irradiation unit configured to irradiate a surface of a solid sample with an ion stream of a specific ion species having a preset value of kinetic energy at a predetermined incident angle; an observation unit configured to observe scattered ions that originate from the ion stream and have undergone a charge transfer reaction with an atom or molecule present on a surface of the solid sample; and an information calculation unit configured to obtain information on electrical properties or physical properties on a surface of the solid sample on the basis of an observation result of the scattered ions in the observation unit. As a result, it is possible to efficiently acquire, in a short time, the distribution of the information on the electrical properties or physical properties such as the surface potential of the solid sample.

18 Claims, 5 Drawing Sheets

(56)        References Cited

OTHER PUBLICATIONS

"Ion Scattering Spectroscopy", [Online], [Searched on Nov. 4, 2021], Thermo Fisher Scientific (Thermo Fisher Scientific Inc.), Internet <URL: https://www.jp.xpssimplified.com/ion_scattering_spectroscopy.php >.

Furuhashi, Osamu, et al. "Studies of doubly charged molecular ions using high-resolution double charge transfer spectrometer." Journal—Mass Spectrometry Society of Japan 50.1; ISSU 211 (2002): 24-32.

Hiroshi Onishi, "Working with the Kelvin probe force microscope (KPFM)", Chemistry and Industries, 2011, vol. 64, pp. 468-469.

Nobuo Sato et al., "Development of Kelvin Probe Surface Force Microscope and its Basic Characteristics", Chiba Institute of Technology Research Report, ed., 2014, No. 61, pp. 53-58.

Osamu Furuhashi, "Spectroscopy of molecular dications through the two-electron transfer process of protons", Doctoral (Science) thesis, University of Electro-Communications, Report No. Ko No. 244, 2001.

Scanning Kelvin probe system (SKP series), [Online], [searched on Nov. 4, 2021], Tokyo Instruments Co., Ltd., Internet < URL:https://www.tokyoinst.co.jp/products/detail/work_function_surface_potential_measurement/KT01/index.html >.

Written Opinion (ISA 237) dated Aug. 16, 2022 for PCT application No. PCT/JP2022/022132.

* cited by examiner $H^+$          M $M^{2+}$          $H^-$ $H^+$ ———— 13.598 eV $Q_1 = 14.352$ eV H  - - - - - - -  0 eV $H^-$ ———— -0.754 eV $M^{2+}$ ————  DOUBLE IONIZATION ENERGY      $I\,M_2$ $Q_2 = I\,M_2$ eV $M^+$  - - - - - -  IONIZATION ENERGY      $I\,M_1$ M ———— 0 eV

CASE WHERE SURFACE POTENTIAL IS 0 V

CASE WHERE SURFACE POTENTIAL IS -$V_T$

SURFACE ANALYSIS METHOD AND SURFACE ANALYSIS APPARATUS

TECHNICAL FIELD

The present invention relates to a method and an apparatus for analyzing a surface of a solid sample.

BACKGROUND ART

In research and development of metals and semiconductor materials used as battery materials and the like, it is significantly important to measure and evaluate various electrical properties or physical properties of a surface of a solid sample. In addition, it is necessary to measure the electrical properties of a surface of a solid sample in the analysis of contaminants adhering to the sample surface, the analysis of metal corrosion, or the like.

As one of such apparatuses for measuring electrical properties of a solid surface, Kelvin probe force microscopy (KPFM) is known (refer to Non Patent Literatures 1 to 3). As described in Non Patent Literature 1, it can be said that KPFM is an evolved form of an atomic force microscope (AFM) which is mainly used for observing the shape of a sample surface.

In the AFM, a probe having a sharp tip is brought close to a surface of a sample while the probe is being vibrated substantially in a direction parallel to the length of the probe, and the probe is moved along the sample surface in a non-contact manner while the distance between the tip of the probe and the sample surface is adjusted such that the period and amplitude of vibration of the probe are unchanged. The trajectory of the probe during that time in the plane of the vibration of the probe reflects the shape of the sample surface, and thus it is possible to measure the shape of the sample surface.

In KPFM, a DC voltage that cancels a contact potential difference generated between the probe and the sample in a state where the probe is vibrating in this manner is applied to the probe, and the surface potential is calculated on the basis of the value of the DC voltage. In addition, it is known that the surface potential and the work function have a predetermined relationship, and by using this, it is possible to obtain the work function from the surface potential.

In many AFMs currently commercially available, measurement by KPFM is possible as an optional function. In addition, there is a product dedicated to KPFM as disclosed in Non Patent Literature 3.

CITATION LIST

Non Patent Literature

Non Patent Literature 1: Hiroshi Onishi, "Working with the Kelvin probe force microscope (KPFM)", Chemistry and Industries, 2011, Vol. 64, pp. 468-469

Non Patent Literature 2: Nobuo Sato, and one other, person, "Development of Kelvin Probe Surface Force Microscope and its Basic Characteristics", Chiba Institute of Technology Research Report, ed., 2014, No. 61, pp. 53-58

Non Patent Literature 3: "Scanning Kelvin probe system (SKP series)", [Online], [searched on Nov. 4, 2021], Tokyo Instruments Co., Ltd., Internet Non Patent Literature 4: Osamu Furuhashi, "Spectroscopy of molecular dications through the two-electron transfer process of protons", Doctoral (Science) thesis, University of Electro-Communications, Report number: Ko No. 244, 2001

Non Patent Literature 5: "Ion Scattering Spectroscopy", [Online], [Searched on Nov. 4, 2021], Thermo Fisher Scientific (Thermo Fisher Scientific Inc.), Internet

SUMMARY OF INVENTION

Technical Problem

KPFM makes it possible to observe a distribution of a characteristic of a metal material or a semiconductor material, a corrosion state of a metal surface, and the like as a change in a two-dimensional distribution of a surface potential or a work function in a non-destructive manner. In addition, KPFM described in Non Patent Literature 3 can measure those of not only metal materials and semiconductor materials but also dielectric materials such as oxides. However, the surface potential distribution measurement with KPFM has the following problems.

(1) In KPFM, it is necessary to move the probe on a surface of a sample while repeating a search for a voltage that cancels the contact potential between the sample and the probe. Therefore, it is necessary to reduce the moving speed (that is, the scanning speed) of the probe as compared with a normal AFM, and a long measurement time is required. This results in a decrease in the throughput of the measurements. In addition, when trying to obtain a surface potential distribution over a wide area on the sample, if the measurement time is long, the obtained distribution image may be distorted due to thermal expansion or contraction of the sample during the measurement.

(2) In KPFM, the minute displacement of the probe is typically detected with laser light. Therefore, in a case where the sample is optically active, when light originating from the laser light strikes the sample, the measurement may be affected.

(3) In KPFM, a feedback circuit or the like for accurately maintaining the constant distance between the probe and the sample is required, and thus the configuration of the apparatus is complicated and the apparatus is expensive.

Further, in research and development of new materials, there is a strong demand for simultaneously acquiring various information of electrical properties or physical properties on the surface of a solid sample with the same apparatus. However, what can be measured by KPFM is limited to the surface potential and the work function of a certain site on the sample and their distributions, and further information such as the double ionization energy or the spin state of electrons on the solid surface cannot be obtained by AFM or KPFM.

The present invention has been made to solve at least one of the above problems, and a main object of the present invention is to provide a surface analysis method and an apparatus capable of efficiently measuring a surface potential distribution and the like of a solid sample in a short time.

Another object of the present invention is to provide a surface analysis method and an apparatus capable of acquiring information relating to not only the surface potential of the solid sample but also electrical properties or physical properties of the solid surface in a simultaneous manner.

Solution to Problem

A mode of a surface analysis method according to the present invention includes:

an ion irradiation step of irradiating a surface of a solid sample with an ion stream of a specific ion species having a preset value of kinetic energy at a predetermined incident angle;

an observation step of observing scattered ions that originate from the ion stream and have undergone a charge transfer reaction with an atom or molecule present on the surface of the solid sample; and an information calculation step of obtaining information on electrical properties or physical properties on a surface of the solid sample on the basis of an observation result of the scattered ions in the observation step.

In addition, a mode of the surface analysis apparatus according to the present invention includes:

an ion irradiation unit configured to irradiate a surface of a solid sample with an ion stream of a specific ion species having a preset value of kinetic energy at a predetermined incident angle;

an observation unit configured to observe scattered ions that originate from the ion stream and have undergone a charge transfer reaction with an atom or molecule present on the surface of the solid sample; and an information calculation unit configured to obtain information on electrical properties or physical properties on a surface of the solid sample on the basis of an observation result of the scattered ions in the observation unit.

Advantageous Effects of Invention

According to the above mode of the surface analysis method and the surface analysis apparatus according to the present invention, a troublesome operation of searching for a voltage that cancels the contact potential as performed in KPFM is unnecessary, and thus, for example, information such as the surface potential at a certain point on the surface of the solid sample can be acquired in a short time. In addition, when the distribution of the surface potential in a predetermined one-dimensional region or two-dimensional region on the surface of the solid sample needs to be acquired, the result can be obtained in a measurement time sufficiently shorter than that of KPFM. Consequently, the throughput of measurement can be improved, and a good distribution image can be obtained without being affected by thermal expansion/contraction of the sample during measurement.

According to the above mode of the surface analysis method and the surface analysis apparatus according to the present invention, it is possible to acquire, in addition to information of the surface potential and the work function obtained therefrom, useful information relating to the solid surface, such as the double ionization energy or the spin state of electrons on the solid surface, which have been difficult to be acquired with conventional apparatus. As a result, it is possible to obtain new knowledge that has not been conventionally obtained for, for example, a conductor material such as metal, a semiconductor material, and the like.

DESCRIPTION OF EMBODIMENTS

[Measurement Principle of Surface Analysis Method According to the Present Invention]

The present inventor has been engaged in research and development of double charge transfer spectroscopy disclosed in Non Patent Literature 4 as a method for measuring double ionization energy of gas phase molecules. From the experience and the findings obtained from the research and development, the present inventor has conceived that a similar method is used for measuring electrical properties or physical properties of a solid surface, and have obtained the present invention.

Figures 3A, 3B, 4A, 4B:
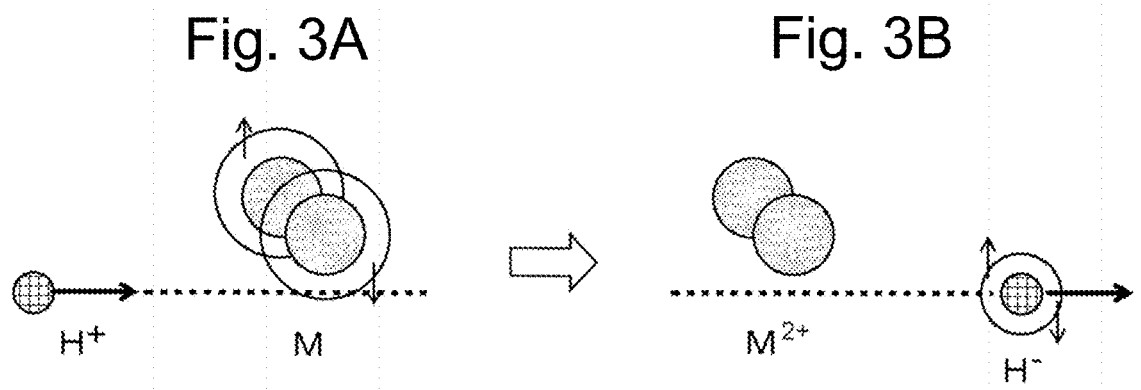
FIGS. 3A-3B are conceptual diagrams for explaining a double charge transfer reaction for gas phase molecules.
FIGS. 4A-4B are explanatory diagrams of an energy balance in the double charge transfer reaction illustrated in FIGS. 3A-3B.

First, the principle of double charge transfer spectroscopy will be described with reference to FIGS. 3A-3B and 4A-4B. FIGS. 3A-3B are conceptual diagrams for explaining a double charge transfer reaction for gas phase molecules, and FIGS. 4A-4B are explanatory diagrams of an energy balance in the double charge transfer reaction.

In the double charge transfer spectroscopy, as illustrated in FIGS. 3A-3B, a positive hydrogen ion (proton: $H^+$) having a preset value of kinetic energy is allowed to pass through the immediate vicinity of a target molecule (M) to be measured that is in a gas phase state, thereby causing a double charge transfer reaction in which two electrons are stripped from the target molecule (M). In FIGS. 3A-3B, two electrons to be transferred are indicated by arrows, and directions of the arrows represent spins of the electrons. The reaction at this time is represented by the following reaction formula (1), where $E_i$ represents the kinetic energy of the introduced positive hydrogen ion ($H^+$), and $E_f$ represents the kinetic energy of the negative hydrogen ion ($H^-$) that scatters by causing the double charge transfer reaction.

$$H^+(E_i) + M \rightarrow H^-(E_f) + M^{2+} \tag{1}$$

That is, the positive hydrogen ion is changed to a monovalent negative hydrogen ion and the target molecule is changed to a divalent positive ion by the double charge transfer reaction.

(1) The reaction of the formula is an endothermic reaction, and the reaction energy is supplied from the kinetic energy of the introduced ions. In this reaction, as illustrated in FIG. 4A, the detected scattering ions ($H^-$) are only in the ground state ($^1S_0$), and the conversion energy $Q_1$ from the positive ion $H^+$ to the negative ion H– is uniquely determined to be $-14.352$ [eV]. On the other hand, if the scattering angle (angle formed by the traveling direction of the incident ion and the traveling direction of the scattered ion) is sufficiently small, the recoil energy by the target molecule, which needs to be considered in the ion scattering spectroscopy described later, can be ignored. Therefore, according to the conservation law of energy and momentum, kinetic energy loss ($\Delta E = E_i - E_f$) of hydrogen ions can provide double ionization energy ($IM_2$) of the target molecule (refer to FIG. 4B).

As a result, the following formula (2) is established.

$$\Delta E = E_i - E_f = Q_1 + Q_2 = IM_2 - 14.352[\text{eV}] \qquad (2)$$

The formula (2) indicates that the double ionization energy $IM_2$ of the target molecule can be calculated by observing the kinetic energy $E_f$ of scattered ions.

In addition, as illustrated in FIGS. 3A-3B, when two electrons move from the target molecule M to the positive hydrogen ion $H^+$, the direction of the electron spin is preserved. Only when a pair of two electrons in the antiparallel spin state held by the target molecule M transfer to the positive hydrogen ion $H^+$, the negative hydrogen ion $H^-$ can be stably present and observed. On the other hand, when two electrons in a parallel spin state facing the same direction are transferred due to the double charge transfer reaction, the $H^+$ ion becomes an $H^-$ ion in an excited state and is divided into a hydrogen atom and an electron in a short time, and thus cannot be observed. In conclusion, the double charge transfer spectroscopy has a feature that ions can be detected only when a pair of two electrons in an antiparallel spin state transfer.

The double charge transfer spectroscopy is a measurement method for gas phase molecules, but the present inventor has conceived to use this method for measurement of double ionization energy on the surface of a solid sample. That is, if the solid surface is irradiated with ions at a significantly shallow angle close to parallel to the solid surface (that is, an incident angle close to) 90° and ions scattered forward from the solid surface at a significantly shallow angle with respect to the ions are observed, measurement substantially similar to the double charge transfer spectroscopy for gas phase molecules can be performed. Therefore, it is possible to calculate the double ionization energy of the molecule (or atom) present on the solid surface from the kinetic energy of the obtained scattered ions.

Herein, such a method of irradiating a solid surface with monovalent positive ions and generating a double charge transfer reaction on the solid surface to detect scattered ions that have become monovalent negative ions by energy discrimination is referred to as charge inversion spectroscopy (CIS). The main purpose of conventional double charge transfer spectroscopy has been to measure the double ionization energy of gas phase molecules. In contrast, the charge inversion spectroscopy has a feature that not only the double ionization energy on the solid surface is observed but also other measurements based on the fact that the target is a solid surface can be performed. As will be described in detail later, one of the features is that the surface potential can be measured by using the fact that the behavior of scattered ions is sensitive to the difference in surface potential at the point (position) where the charge transfer reaction of the solid sample occurs. In addition, another feature is that the spin state on the surface of the solid sample can be observed by using the fact that the spin of electrons is preserved in the charge transfer reaction.

As a measurement method for irradiating a solid surface with ions and detecting scattered ions, ion scattering spectroscopy described in Non Patent Literature 5 is well known. In the ion scattering spectroscopy, a solid sample is irradiated with an ion stream having a preset value of kinetic energy to cause scattering on the surface of the solid sample, and the kinetic energy of scattered ions is measured. In the ion scattering spectroscopy, a peak corresponding to elastic scattering of ions from atoms present on the surface of the solid sample can be observed. The peak is a peak corresponding to the kinetic energy generated by the transfer of the momentum between the incident ion and the atom present on the solid surface, and is a peak different depending on the type of atom (that is, the type of element). Consequently, in the ion scattering spectroscopy, the element present on the solid surface can be identified.

What is important is that, in the ion scattering spectroscopy, although kinetic energy is exchanged between the target atom and the ion, charge transfer does not occur. Therefore, it is found that the charge inversion spectroscopy is similar to the ion scattering spectroscopy in terms of the configuration of the apparatus, but the principle itself of the measurement is completely different, and the information obtained by the measurement is also completely different. However, the similarity in apparatus configuration is advantageous in a case where measurement by ion scattering spectroscopy is also performed by using a surface analysis apparatus capable of performing charge inversion spectroscopy as described later.

[Configuration and Operation of Surface Analysis Apparatus According to One Embodiment of the Present Invention]

Figure 1:
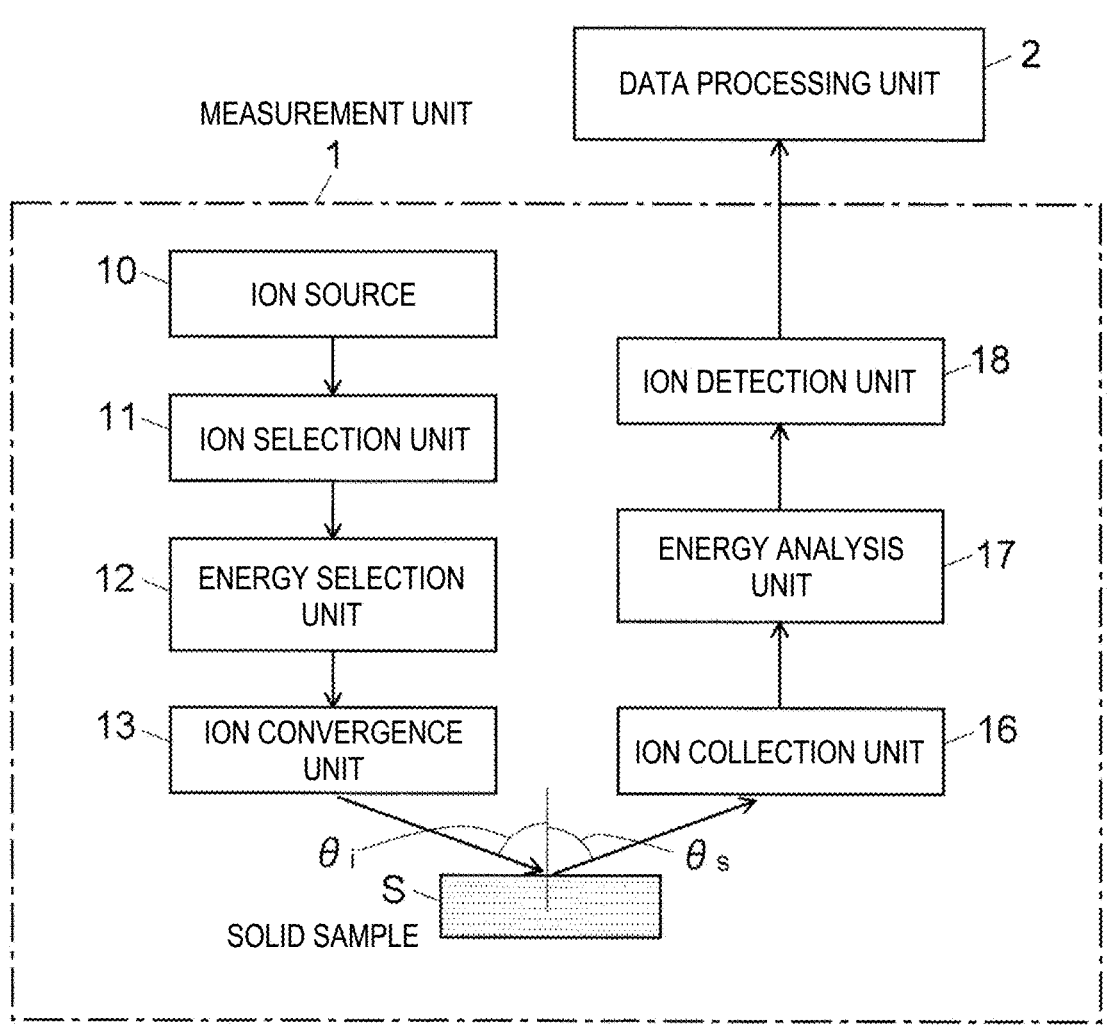
FIG. 1 is a schematic block configuration diagram of a surface analysis apparatus according to one embodiment of the present invention.
Figure 2:
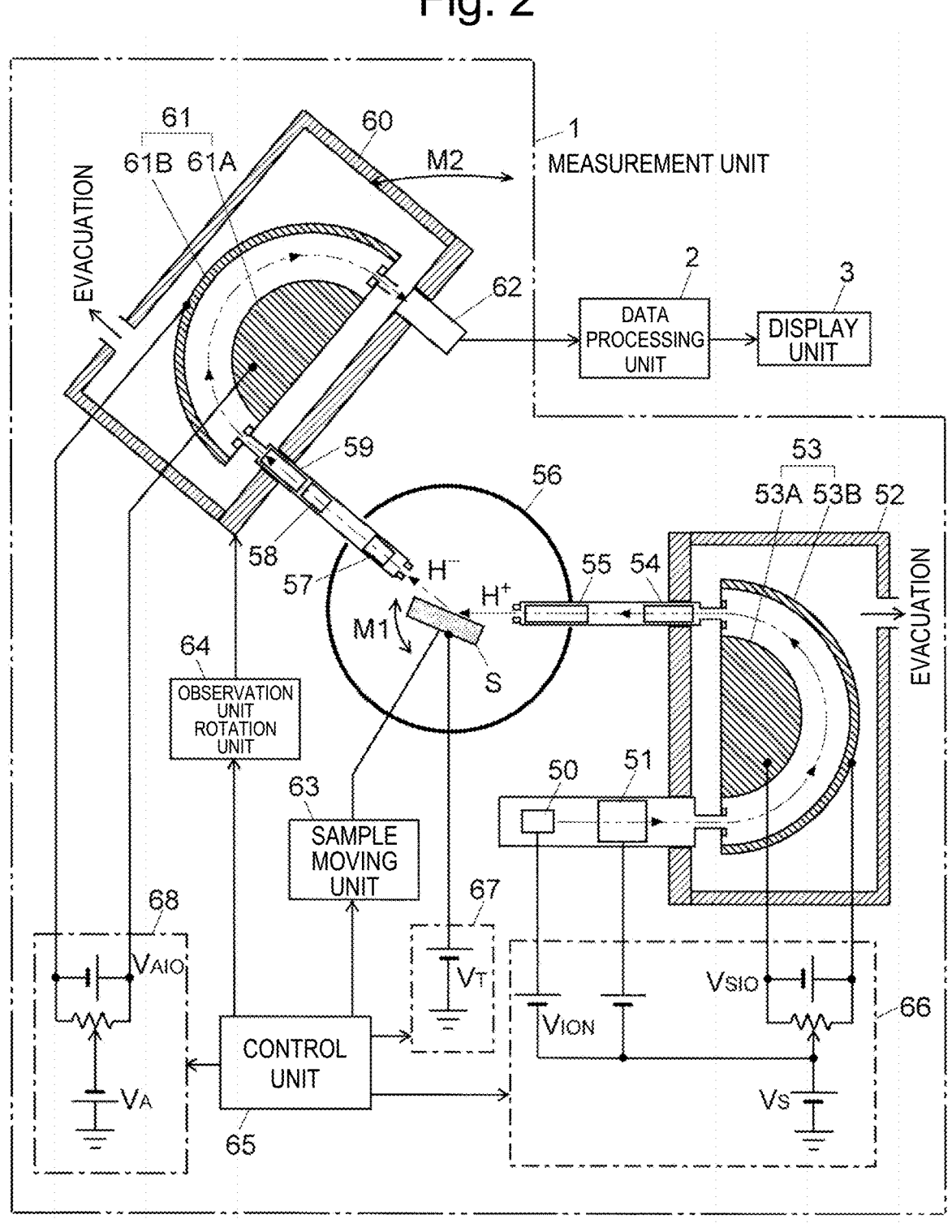
FIG. 2 is a configuration diagram illustrating a specific example of the surface analysis apparatus illustrated in FIG. 1.

FIG. 1 is a schematic block configuration diagram of a surface analysis apparatus according to an embodiment of the present invention using the charge inversion spectroscopy described above. FIG. 2 is a diagram illustrating an example of a more specific configuration of the surface analysis apparatus illustrated in FIG. 1.

As illustrated in FIG. 1, the surface analysis apparatus of the present embodiment includes a measurement unit 1 and a data processing unit 2. The measurement unit 1 includes, as functional blocks, an ion source 10, an ion selection unit 11, an energy selection unit 12, an ion convergence unit 13, an ion collection unit 16, an energy analysis unit 17, and an ion detection unit 18. The ion source 10, the ion selection unit 11, the energy selection unit 12, and the ion convergence unit 13 correspond to an ion irradiation unit in the present invention, and the ion collection unit 16, the energy analysis unit 17, and the ion detection unit 18 correspond to an observation unit in the present invention.

With reference to FIG. 1, a measurement operation in the surface analysis apparatus of the present embodiment will be schematically described.

The ion source 10 ionizes gaseous hydrogen to generate positive hydrogen ions ($H^+$). Molecular ions $H_2^+$ and $H_3^+$ are also generated during ionization.

The ion selection unit 11 selects only monovalent hydrogen ions (protons: $H^+$) among a plurality of generated ion species. The energy selection unit 12 provides predetermined kinetic energy to the selected protons and equalizes the kinetic energy of the protons. Typically, the kinetic energy required for the double charge transfer reaction is much higher than that required by ion scattering spectroscopy, and energy on the order of kV (typically several kV or more) is required. The ion convergence unit 13 narrows the diameter of the ion stream from the proton having a preset value of kinetic energy, and irradiates a minute region on the surface of the solid sample S as a target.

The surface of the solid sample S is irradiated with the ion stream at a predetermined shallow angle (incident angle $\theta_i$ is close to) 90° at which the angle formed with the surface of the solid sample S is small. This incident angle $\theta_i$ is, for example, in a range of $45° \leq \theta_i° < 90°$. Although it is desirable to emit the ion stream at a shallow angle, even if the incident angle is out of the above range, it is possible to theoretically calculate the amount of energy loss due to target recoil if the incident angle and the scattering angle are fixed. Therefore, it is possible to calculate the kinetic energy due to the double charge transfer reaction by using the calculation result and correcting the observation data.

The proton incident on the solid sample S deprives two electrons from a molecule or an atom present in the vicinity of the surface of the solid sample S, that is, causes a double charge transfer reaction represented by the formula (1), and scatters forward as a negative hydrogen ion ($H^-$). In the ions scattered forward at a large emission angle $\theta_s$ close to 90°, the momentum provided from the ions to the atoms and molecules on the surface of the solid sample S is small. Therefore, similarly to the double charge transfer spectroscopy for gas phase molecules, the loss of kinetic energy of ions before and after scattering generally corresponds to the double ionization energy on the surface of the solid sample S. That is, ions scattered forward at a shallow angle have information corresponding to the double ionization energy on the surface of the solid sample S.

As described above, the ion collection unit 16 collects ions falling within a range of a predetermined scattering angle among scattered ions arriving from the solid sample S, and sends the ions to the energy analysis unit 17. Herein, by narrowing down the range of the scattering angle of the ions to be observed, it is possible to exclude, from the observation target, ions that have exchanged a large amount of kinetic energy with atoms and molecules on the surface of the solid sample S.

The energy analysis unit 17 has a function of selectively passing ions having specific kinetic energy. The specific kinetic energy is scanned over a predetermined range. The ion detection unit 18 detects ions selected according to the kinetic energy in the energy analysis unit 17, and generates and outputs a signal corresponding to the amount (number) of ions from moment to moment. That is, the ionic intensity for each kinetic energy of scattered ions can be acquired by a combination of the energy analysis unit 17 and the ion detection unit 18.

The data processing unit 2 sequentially receives and digitizes ionic intensity signals associated with scanning of kinetic energy in the energy analysis unit 17. Then, for example, the difference in kinetic energy before and after scattering is calculated, and an energy spectrum indicating the relationship between the double ionization energy and the signal intensity at the ion irradiation site on the surface of the solid sample S is created.

In this surface analysis apparatus, the solid sample S is moved in the horizontal plane in FIG. 1, and the irradiation position of the ion stream is scanned on the solid sample S, whereby the distribution of the double ionization energy in a predetermined one-dimensional region or two-dimensional region on the surface of the solid sample S can be examined. In addition, as described later, the surface potential, the work function, and the spin state of electrons at a predetermined site on the surface of the solid sample S can be obtained by using the energy spectrum, and further, the surface potential, the work function, and the distribution of the spin state of electrons in a predetermined one-dimensional region or two-dimensional region of the surface of the solid sample S can also be obtained.

Then, a specific configuration and operation of the surface analysis apparatus of the present embodiment will be described with reference to FIG. 2.

An ionization voltage $V_{ION}$ is applied from the main power supply unit 66 to the ion source 50 corresponding to the ion source 10, whereby positive ions mainly including protons generated in the ion source 50 are accelerated toward the downstream of the path. The ionization method is not particularly limited, but for example, an arc discharge method can be adopted to generate a proton beam having high intensity and a preset value of energy. The mass separation unit 51 corresponding to the ion selection unit 11 is, for example, a simple mass analysis apparatus such as a Wien filter, and extracts only protons from ions generated in the ion source 50.

The monochromator 53 corresponding to the energy selection unit 12 is an electrostatic focusing hemispherical spectrometer including an inner electrode 53A and an outer electrode 53B, and a predetermined DC voltage is applied from the main power supply unit 66 to each of the inner electrode 53A and the outer electrode 53B. This applied voltage can be appropriately adjusted in the main power supply unit 66. In the monochromator 53, protons having specific kinetic energy according to the applied voltage are selected, in other words, the kinetic energies of the protons are equalized. The kinetic energy ($E_i$) applied to protons is determined by the potential of the ion source 50 and the potential of the monochromator 53, and this energy is adjusted by the DC voltage Vs generated in the main power supply unit 66. As described above, in order to cause the double charge transfer reaction, it is necessary to impart relatively high kinetic energy in the order of kV to the proton. The monochromator 53 is accommodated in a vacuum chamber 52 to be evacuated.

The protons having the same kinetic energy are converged and accelerated by the converging lens system 54 corresponding to the ion convergence unit 13, and the axial deviation of the ion beam is corrected by the axis correction unit 55 made of a deflection plate, and the surface of the solid sample S is irradiated. Spatially narrowing down the ion beam by the converging lens system 54 allows a minute region on the surface of the solid sample S to be irradiated with the ion beam.

The solid sample S is disposed in the vacuum chamber 56 in a state of being held by a holder not illustrated, and is movable in five axis (X, Y, Z, $\theta$, $\varphi$) directions by the sample moving unit 63. The sample moving unit 63 rotates the solid sample S as indicated by an arrow M1 in FIG. 2, whereby the incident angle of the ion beam on the solid sample S can be appropriately adjusted. As described above, typically, the incident angle $\theta_i$ of the ion beam with respect to the surface of the solid sample S is close to 90°, and the angle can be experimentally determined in advance, for example. In addition, the sample moving unit 63 appropriately moves the solid sample S in the maximum five-axis direction, whereby the irradiation position of the ion beam on the surface of the solid sample S can be two-dimensionally scanned.

As described above, when protons are incident on the surface of the solid sample S at a shallow angle, a double charge transfer reaction occurs, and hydrogen negative ions whose polarity is reversed are scattered forward. A positive DC high voltage is applied to the converging lens system 57, and hydrogen negative ions generated by the double charge transfer reaction are converged and conveyed downstream with high efficiency, while a large amount of protons that do not cause the charge transfer reaction are bounced back. That is, the converging lens system 57 also has a function of preventing a large amount of protons from being accelerated and entering downstream. Hydrogen negative ions within a predetermined scattering angle range among forward scattered ions are cut out by the aperture 58 corresponding to the ion collection unit 16, and introduced into the energy analysis unit 61 via the deceleration lens system 59.

The energy analysis unit 61 is an electrostatic focusing hemispherical spectrometer having the same structure as the monochromator 53, and includes an inner electrode 61A and an outer electrode 61B. A predetermined DC voltage is applied to each of the inner electrode 61A and the outer electrode 61B from the energy analysis power supply unit 68 controlled by the control unit 65. The energy analysis power supply unit 68 changes the DC voltage $V_A$ that determines the potential of the energy analysis unit 61 while maintaining a constant potential difference between the inner electrode 61A and the outer electrode 61B. As a result, the kinetic energy of ions passing through the energy analysis unit 17 can be scanned within a predetermined range.

Similarly to the monochromator 53, the energy analysis unit 61 is accommodated in the vacuum chamber 60 to be evacuated, but the entire observation unit including the vacuum chamber 60 can be rotated in a direction indicated by an arrow M2 in FIG. 2 by the observation unit rotation unit 64. As a result, it is possible to change the scattering angle of the ions to be collected as an observation target among the ions scattered from the surface of the solid sample S.

Figure 6A:
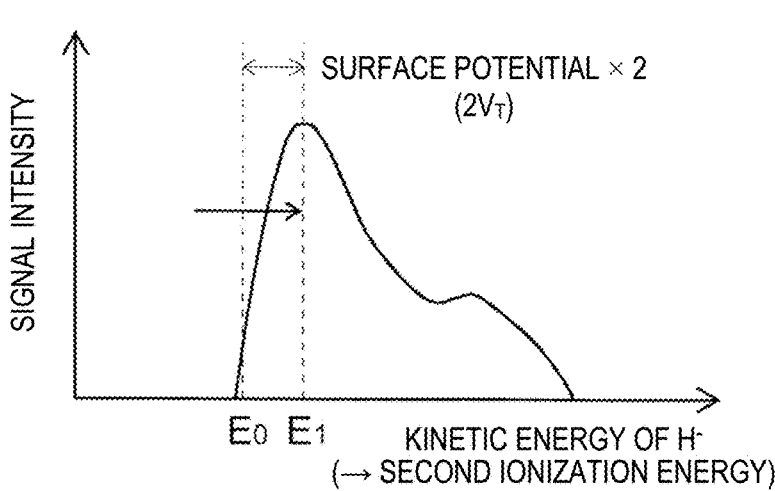
FIGS. 6A-6C are diagrams illustrating an example of an energy spectrum obtained by charge inversion spectroscopy.
Figure 6B:
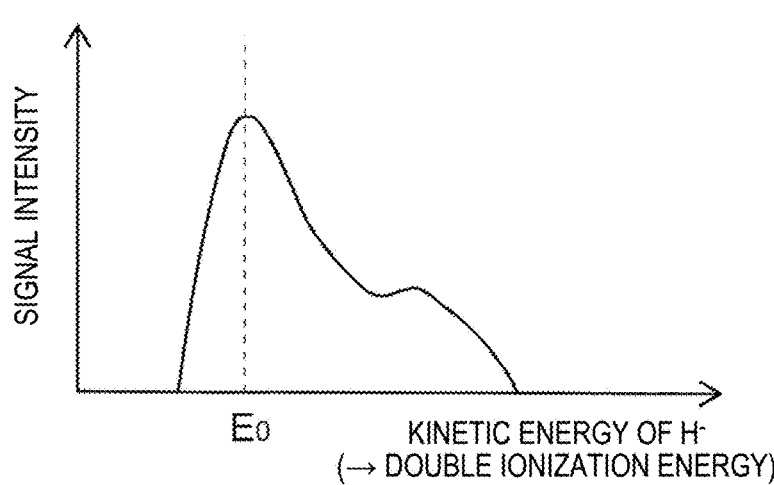
Figure 6C:
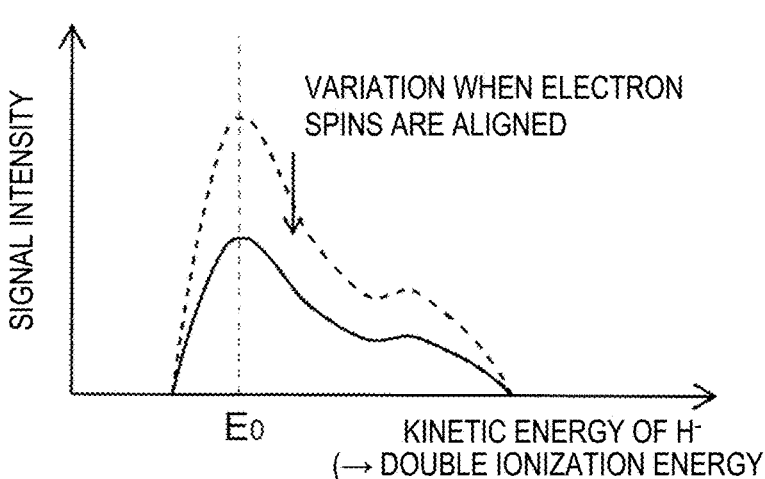

The ions having specific kinetic energy that have passed through the energy analysis unit 17 reach the ion detection unit 62 that is, for example, an electron multiplier tube, and the ion detection unit 62 outputs a detection signal corresponding to the amount of the ions. As described above, the data processing unit 2 receives the detection signal, creates, for example, an energy spectrum, and outputs the result to the display unit 3. As will be described in detail later, FIGS. 6A-6C are examples of an energy spectrum to be created. A plurality of elements are typically present in a minute region to be measured on the surface of the solid sample S, and the double ionization energy differs by an element. Therefore, in the energy spectrum, a peak having a shape corresponding to the type and the abundance of each element appears.

In the surface analysis apparatus of the present embodiment, the sample power supply unit 67 can apply a predetermined DC voltage $V_T$ to the solid sample S in response to an instruction from the control unit 65. Typically, the sample power supply unit 67 does not apply the DC voltage $V_T$, and the solid sample S has a zero potential. On the other hand, as will be described later, when the DC voltage $V_T$ is applied to the solid sample S, the entire peak observed in the energy spectrum is shifted in the lateral direction by an amount corresponding to $2 \times V_T$. Therefore, for example, in a case where background noise exists in specific energy on the energy spectrum, by applying a predetermined DC voltage $V_T$ to the solid sample S by the sample power supply unit 67, it is possible to move the peak to a position not overlapping with the background noise, to allow the peak due to the double ionization energy to be accurately observed.

[Principle of Measuring Surface Potential in Charge Inversion Spectroscopy]

Figure 5A:
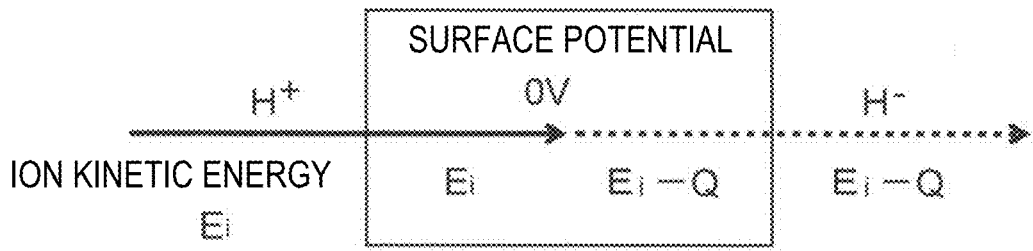
FIGS. 5A-5B are explanatory diagrams illustrating changes in kinetic energy of scattered ions in a case where there is no surface potential and in a case where there is surface potential in charge inversion spectroscopy.
Figure 5B:
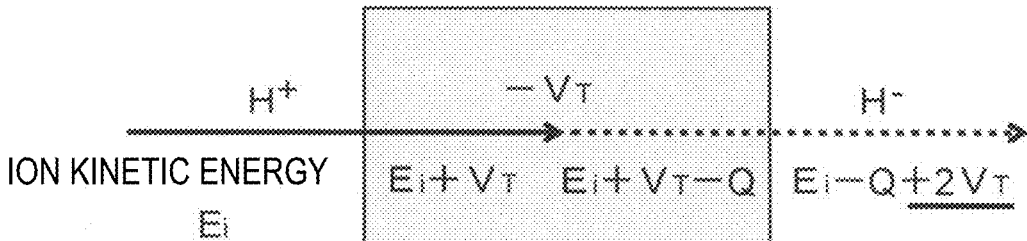

As described above, in principle, in the charge inversion spectroscopy, the double ionization energy on the surface of the solid sample S can be obtained, and in addition, the surface potential and the work function of the solid sample S can be obtained. FIGS. 5A-5B are diagrams for explaining a change in kinetic energy of scattered ions in a case (A) where no potential is on the surface of the solid sample S (potential zero) and in a case (B) where a potential is on the surface.

As illustrated in FIG. 5A, when the surface potential of the solid sample is zero, the kinetic energy of the hydrogen ions $H^+$ incident on the solid sample is $E_i$, and when the reaction heat in the double charge transfer reaction on the sample surface is Q, the kinetic energy of the negative hydrogen ions $H^-$ scattering is $E_f = E_i - Q$.

On the other hand, as illustrated in FIG. 5B, when the surface potential at the site where the double charge transfer reaction occurs on the sample surface is $-V_T$ (where $V_T > 0$), hydrogen ions $H^+$ incident on the solid sample are accelerated by the surface potential, and thus the kinetic energy thereof is $E_i + V_T$. In addition, when the negative hydrogen ions $H^-$ generated by the double charge transfer reaction leave the solid sample, the ions are accelerated by the surface potential. Therefore, the negative hydrogen ions $H^-$ scattered on the solid surface have kinetic energy larger by $2 \times V_T$ than that when the surface potential is zero ($E_f = E_i - Q + 2V_T$). That is, the surface potential at the ion incident point (point where the double charge transfer reaction occurs) is doubled and appears in the kinetic energy of the scattering ion $H^-$.

A point to be noted is that, in normal ion scattering spectroscopy in which scattered ions are detected without a double charge transfer reaction, the difference in the surface potential of the sample as described above does not appear in the kinetic energy of the scattered ions. That is, the difference in the surface potential of the sample in the kinetic energy of the scattered ions is a phenomenon peculiar to charge inversion spectroscopy with a double charge transfer reaction, and in the present invention, the surface potential of the solid sample can be measured by using the phenomenon. In addition, when the surface potential is known, the work function can be obtained by calculation from the result.

FIGS. 6A-6C described above are examples of an energy spectrum obtained by the surface analysis apparatus of the present embodiment, and the horizontal axis represents the kinetic energy of the scattered ions $H^-$ or the double ionization energy obtained from the kinetic energy, and the vertical axis represents the signal intensity (ionic intensity). FIG. 6B is an energy spectrum when the surface potential is zero. From this energy spectrum, the double ionization energy on the sample surface can be known. In addition, as described above, the shape of the peak observed in the energy spectrum depends on the type and the abundance of the element present in the measurement target site on the sample, and thus the shape of the peak can be used to determine, for example, the identity, similarity, and the like of an existing substance. That is, the shape of the peak in the energy spectrum can be used as a "fingerprint" of the sample.

FIG. 6A is an energy spectrum when the sample has a surface potential $V_T$, and at this time, the peak is shifted in the lateral direction by twice the surface potential ($2V_T$). As a result, if the energy spectrum when the surface potential is zero is obtained, the surface potential can be calculated on the basis of the shift amount from the peak observed in the energy spectrum. In addition, similarly obtaining the surface potential at each position in the two-dimensional region on the sample can provide the distribution of the surface potential.

In addition, as described above, in a case where the energy spectrum is acquired in a state where the DC voltage is applied to the solid sample, the peak is shifted in the lateral direction according to the surface potential corresponding to the applied voltage as in FIG. 6A. As a result, it is possible to separate the peak of the detection signal to be observed and the background noise.

[Measurement Principle of Spin State in Charge Inversion Spectroscopy]

Then, a method for measuring the spin state of electrons on the surface of the solid sample S will be described. As described above, in the charge inversion spectroscopy, the observed scattering ion (H$^-$) is only in the ground state $^1S_0$. Therefore, according to a well-known preservation rule of electron spins, spins of two electrons that can be stripped from a target molecule, which are observed in the double charge transfer reaction, are limited to those in an antiparallel state. In other words, two electrons indicating a spin in a parallel state directed in the same direction are not observed even when stripped from the target molecule. Therefore, there is a difference in the occurrence probability of the double charge transfer reaction between when the electron spins on the surface of the solid sample are aligned and when not aligned. Consequently, a difference appears in the observed intensity of scattered ions depending on the degree of alignment of electron spins on the surface of the solid sample.

FIG. 6C is an example of an energy spectrum in a case where spins of electrons on the sample surface are aligned to some extent. In this case, the occurrence probability of the double charge transfer reaction of peeling off two electrons having spins in the antiparallel state decreases, and thus the signal intensity decreases entirely or partially as indicated by arrows in the figure. The degree of decrease in the signal intensity reflects the degree of alignment of the spins of the electrons. Therefore, for example, obtaining the degree of decrease in signal intensity from the energy spectrum at each position in the two-dimensional region of the surface of the solid sample can provide distribution information on how the electron spins are aligned.

As described above, according to the surface analysis apparatus of the present embodiment, it is possible to obtain a distribution image of the double ionization energy, the surface potential, the work function, the spin state of electrons, and the like on the surface of the solid sample by acquiring the energy spectrum as illustrated in FIGS. 6A-6C at each position while scanning the irradiation position of the ion stream in the two-dimensional region of the surface of the solid sample. The measurement of the energy spectrum of scattered ions at a certain position is completed in a short time, and thus the surface potential distribution can be acquired in a sufficiently short time compared to KPFM.

When the measurement as described above is performed by charge inversion spectroscopy in the surface analysis apparatus of the above embodiment, it is necessary to appropriately set the kinetic energy of the proton with which the solid sample S is irradiated and appropriately adjust the incident angle on the surface of the solid sample S. In addition, it is desirable to appropriately adjust the scattering angle of scattered ions collected as an observation target. On the other hand, appropriately changing these measurement conditions can also perform measurement by conventional ion scattering spectroscopy.

Specifically, the kinetic energy of protons with which the solid sample S is irradiated may be relatively reduced, and the incident angle of the ion beam may be relatively reduced. Alternatively, the gas introduced into the ion source may be changed to helium, and the solid sample may be irradiated with the generated helium ions. As described above, in the surface analysis apparatus of the present embodiment, there can be performed not only the measurement of the surface potential based on the charge inversion spectroscopy but also the analysis of the type and the abundance of the element present on the sample surface with the ion scattering spectroscopy.

In the configuration example illustrated in FIG. 2, the electrostatic focusing hemispherical spectroscope is used as both the monochromator 53 and the energy analysis unit 61, but a spectroscope of another type may be used. For example, when an electrostatic cylindrical spectrometer is used as the energy analysis unit 61, acceptance of ions increases, and signal intensity can be increased.

In addition, when an ion detector obtained by combining a microchannel plate and a two-dimensional detector is used as the ion detection unit 62 instead of the electron multiplier tube, ions having different energies spatially separated by the energy analysis unit 61 can be simultaneously detected. Consequently, the time required for energy scanning in the energy analysis unit 61 can be shortened, and the measurement time can be further shortened.

In addition, in the surface analysis apparatus of the above embodiment, the ion beam of the proton is narrowed and irradiated to the surface of the solid sample, and the irradiation position is moved on the solid sample to obtain the ionic intensity signal for the two-dimensional region on the sample. However, adopting a configuration similar to that of a so-called projection imaging mass spectrometer can acquire the ionic intensity signal in the two-dimensional region at a time.

That is, in the projection-type surface analysis apparatus, a proton ion beam having a large cross-sectional area and a preset value of kinetic energy is formed, and a wide region on the surface of the solid sample is irradiated with the ion beam. In contrast, the negative hydrogen ions H$^-$ scattered from each position in the wide region on the sample are detected after the kinetic energy is analyzed while the positional information is maintained, whereby the ionic intensity signal corresponding to the wide region on the surface of the solid sample is acquired substantially simultaneously. In this configuration, the time for scanning the irradiation position of the ion beam on the sample can be omitted or shortened, and thus the distribution measurement of various types of information can be performed in a short time.

The above embodiment and the modified example are included in the present invention as an only example. It is apparent that any modification, change, or addition within the scope of the present invention is included in the scope of claims of the present application.

[Various Modes]

A person skilled in the art can understand that the previously described illustrative embodiments are specific examples of the following modes of the present invention.

(Clause 1) A mode of a surface analysis method according to the present invention includes:

an ion irradiation step of irradiating a surface of a solid sample with an ion stream of a specific ion species having a preset value of kinetic energy at a predetermined incident angle;

an observation step of observing scattered ions that originate from the ion stream and have undergone a charge transfer reaction with an atom or molecule present on the surface of the solid sample; and an information calculation step of obtaining information on electrical properties or physical properties on a surface of the solid sample on the basis of an observation result of the scattered ions in the observation step.

(Clause 2) In the surface analysis method according to clause 1, the information on electrical properties or physical properties on a surface of the solid sample may be at least one of double ionization energy, surface potential, work function, and spin state of electrons.

(Clause 10) A mode of the surface analysis apparatus according to the present invention includes:

an ion irradiation unit configured to irradiate a surface of a solid sample with an ion stream of a specific ion species having a preset value of kinetic energy at a predetermined incident angle;

an observation unit configured to observe scattered ions that originate from the ion stream and have undergone a charge transfer reaction with an atom or molecule present on the surface of the solid sample; and an information calculation unit configured to obtain information on electrical properties or physical properties on a surface of the solid sample on the basis of an observation result of the scattered ions in the observation unit.

(Clause 11) In the surface analysis apparatus according to clause 10, the information calculation unit may be configured to obtain at least one of double ionization energy, surface potential, work function, and spin state of electrons as the information.

In the surface analysis method according to clauses 1 and 2 and the surface analysis apparatus according to clauses 10 and 11, a method based on the same principle as that of double charge transfer spectroscopy for gas phase molecules is used for surface analysis of a solid sample. In particular, in charge inversion spectroscopy for a solid sample, the surface potential of a solid can be determined by utilizing the fact that charges are reversed between incident ions and scattered ions due to the double charge transfer reaction.

According to the surface analysis method described in clauses 1 and 2 and the surface analysis apparatuses described in clauses 10 and 11, it is not necessary to perform a troublesome operation of searching for a voltage that cancels the contact potential performed by KPFM, and thus, for example, information such as the surface potential at a certain point on the surface of the solid sample can be obtained in a short time. In addition, when the distribution of the surface potential within a predetermined two-dimensional region on the surface of the solid sample needs to be acquired, the result can be obtained in a sufficiently short measurement time compared to KPFM. Consequently, the throughput of measurement can be improved, and a good distribution image can be obtained without being affected by thermal expansion/contraction of the apparatus during measurement.

In addition, according to the surface analysis method described in clauses 1 and 2 and the surface analysis apparatus described in clauses 10 and 11, it is possible to acquire not only information of the surface potential and the work function obtained from the surface potential but also useful information on the solid surface, such as the double ionization energy and the spin state of electrons on the solid surface, which have been difficult to acquire by existing apparatuses. As a result, it is possible to obtain new knowledge that has not been conventionally obtained for, for example, a conductor material such as metal, a semiconductor material, and the like.

(Clause 3) In the surface analysis method according to clause 1 or 2, the specific ion species may be proton, and in the observation step, negative hydrogen ions scattered after undergoing charge inversion on the surface of the solid sample may be observed.

(Clause 12) In the surface analysis apparatus according to clause 10 or 11, the specific ion species may be proton, and the observation unit may be configured to observe negative hydrogen ions scattered after undergoing charge inversion on the surface of the solid sample.

Hydrogen ions have only one electronic state at the time of observation before scattering ($H^+$) and after scattering ($H^-$), and thus the reaction heat $Q_1$ is uniquely determined (14.352 [eV]). This means that the double ionization energy is uniquely obtained from the kinetic energy of scattered ions. In contrast, in a case where an atom other than hydrogen is used, when a double charge transfer reaction from a monovalent positive ion to a monovalent negative ion occurs, there are a plurality of electronic states before and after the reaction, and thus, there are a plurality of values of the reaction heat $Q_1$, and the observation spectrum becomes complicated. Similarly, in a case where atoms other than hydrogen are used, there are a plurality of spin states of electrons before and after scattering, and thus there is no selection rule of electron spin (that is, only antiparallel electrons are observed).

According to the surface analysis method described in clause 3 and the surface analysis apparatus described in clause 12, protons are used as ions to irradiate the solid sample, and thus it is easy to calculate the double ionization energy from the kinetic energy of scattered ions and it is also possible to observe the electron spin state for the above reason.

Since a proton is the lightest ion, its ionization, acceleration by an electric field, control of the trajectory, and the like are easy. In addition, when a solid sample is irradiated with protons and a double charge transfer reaction occurs on the surface of the solid sample and the protons are scattered, the exchange of kinetic energy with atoms or the like on the solid surface is small. Therefore, according to the surface analysis method described in clause 3 and the surface analysis apparatus described in clause 12, it is advantageous to simplify the apparatus configuration. Further, hydrogen is relatively inexpensive, and thus it is also advantageous for cost reduction at the time of measurement.

(Clause 4) In the surface analysis method described in any one of clauses 1 to 3, an ion stream and/or the solid sample may be moved such that an irradiation position of the ion stream on the surface of the solid sample is two-dimensionally scanned on the surface, and in the information calculation step, mapping of information on the surface of the solid sample may be performed using the information obtained along with the movement.

(Clause 13) The surface analysis apparatus according to any one of clauses 10 to 12 may further include a scanning unit configured to move the ion stream and/or the solid sample such that the irradiation position of the ion stream on the surface of the solid sample is two-dimensionally scanned on the surface, and the information calculation unit may be configured to map the information on the surface of the solid sample using information obtained with the movement of the ion stream and/or the solid sample by the scanning unit.

According to the surface analysis method described in clause 4 and the surface analysis apparatus described in clause 13, it is possible to acquire the distribution image of the double ionization energy and the distribution image of the surface potential on the surface of the solid sample with high measurement throughput. Accordingly, it is possible to provide useful information in research and development of metal materials, semiconductor materials, and the like.

(Clause 5) In the surface analysis method according to any one of clauses 1 to 4, in the ion irradiation step, an incident angle of an ion stream to the solid surface may be changed, and in the observation step, a scattering angle of ions to be observed may be changed, whereby scattered ions are allowed to be observed without accompanying the charge transfer reaction.

(Clause 14) In the surface analysis apparatus according to any one of clauses 10 to 13, the ion irradiation unit may be configured to allow change of an incident angle of an ion stream with respect to the solid sample, and the observation unit may be configured to allow change of a scattering angle of an ion to be observed.

In the surface analysis method according to clause 5 and the surface analysis apparatus according to clause 14, not only measurement of a surface potential or the like by charge inversion spectroscopy but also analysis such as identification of an element present on a solid surface by ion scattering spectroscopy can be performed. Consequently, useful and complex information on metal materials and semiconductor materials can be provided.

(Clause 6) In the surface analysis method according to any one of clauses 1 to 5, in a state where a voltage is applied to the solid sample, information of electrical properties or physical properties on the surface of the solid sample may be acquired by the ion irradiation step, the observation step, and the information calculation step.

(Clause 15) The surface analysis apparatus according to any one of clauses 10 to 14 may further include a voltage application unit configured to apply a voltage to the solid sample.

In charge inversion spectroscopy, the kinetic energy of scattered ions changes depending on the surface potential of the solid sample. Therefore, when a DC voltage is applied to the solid sample to generate a surface potential, the energy distribution of the scattered ions is shifted in the energy axis direction, and the energy distribution due to the double ionization energy on the sample surface and the undesirable background noise appearing in the specific energy can be separated. In this manner, according to the surface analysis method described in clause 6 and the surface analysis apparatus described in clause 15, the double ionization energy on the sample surface can be accurately measured even when background noise exists at specific energy or in a specific energy range.

(Clause 7) In the surface analysis method according to any one of clauses 1 to 6, the state of the solid sample is changed by an action from the outside, and in the information calculation step, information according to a difference in presence or absence of a state change of the solid sample can be acquired.

(Clause 16) The surface analysis apparatus according to any one of clauses 10 to 15 may further include a change occurrence unit configured to change a state of the solid sample by an action from the outside, and the information calculation unit may be configured to acquire information according to a difference in presence or absence of a state change of the solid sample by the change occurrence unit.

The term "action from the outside" as used herein includes application of a voltage, that is, generation of an electric field to the sample as described above, and may include other actions such as generation of a magnetic field, irradiation with light, provision of heat (hot, cold), change of humidity, and provision of vibration. According to the surface analysis method described in clause 7 and the surface analysis apparatus described in clause 16, it is possible to acquire information on a difference in characteristics on the surface of the solid sample due to the presence or absence of an action from the outside.

For example, in operando measurement of an electronic device that has attracted attention in recent years, attempts have been made to elucidate a function, a reaction, a deterioration mechanism, and the like of the device by applying a voltage from the outside to the device and measuring a dynamic process during operation. The surface analysis method described in clause 7 and the surface analysis apparatus described in clause 16 are used to obtain, as a distribution image, a change in potential distribution, spin state, or the like in the device due to the presence or absence of an external electric field, thereby allowing operando measurement useful for analysis of the device.

(Clause 8) In the surface analysis method described in any one of clauses 1 to 7, an ion stream that hits the surface of the solid sample may be spatially narrowed down, and information on a minute region on the surface of the solid sample may be acquired.

(Clause 17) In the surface analysis apparatus according to any one of clauses 10 to 16, the ion irradiation unit may include a narrowing unit configured to spatially narrow an ion stream that hits the surface of the solid sample.

According to the surface analysis method described in clause 8 and the surface analysis apparatus described in clause 17, information on electrical properties or physical properties of a minute region on the surface of the solid sample can be acquired.

(Clause 9) In the surface analysis method according to any one of clauses 1 to 8, in the ion irradiation step, the surface of the solid sample may be intermittently irradiated with an ion stream, and in the observation step, scattered ions may be observed corresponding to a period during the ion stream irradiation.

(Clause 18) In the surface analysis apparatus according to any one of clauses 10 to 17, the ion irradiation unit may be configured to allow intermittent emission of the ion stream.

In a case where the solid sample is an insulator, if the solid sample is continuously irradiated with an ion stream, the surface is electrically charge-up, whereby the electrical properties cannot be measured. In contrast, according to the surface analysis method described in clause 9 and the surface analysis apparatus described in clause 18, it is possible to measure the surface potential or the like even with an insulator by eliminating the charge-up of the surface of the solid sample while the irradiation of the ion stream is interrupted.

REFERENCE SIGNS LIST

1 . . . Measurement Unit
10 . . . Ion Source
11 . . . Ion Selection Unit
12 . . . Energy Selection Unit
13 . . . Ion Convergence Unit
16 . . . Ion Collection Unit
17 . . . Energy Analysis Unit
18 . . . Ion Detection Unit
2 . . . Data Processing Unit
3 . . . Display Unit
50 . . . Ion Source
51 . . . Mass Separation Unit
52, 56, 60 . . . Vacuum Chamber
53 . . . Monochromator
53A, 61A . . . Inner Electrode
53B, 61B . . . Outer Electrode
54, 57 . . . Converging Lens System
55 . . . Axis Correction Unit
58 . . . Aperture

US 12,693,248 B2

17

59 . . . Deceleration Lens System
61 . . . Energy Analysis Unit
62 . . . Ion Detection Unit
63 . . . Sample Moving Unit
64 . . . Observation Unit Rotation Unit
65 . . . Control Unit
66 . . . Main Power Supply Unit
67 . . . Sample Power Supply Unit
68 . . . Energy Analysis Power Supply Unit

The invention claimed is:

1. A surface analysis method comprising:
an ion irradiation step of irradiating a surface of a solid sample with an ion stream of a specific ion species having a preset value of kinetic energy at a predetermined incident angle;
an observation step of observing scattered ions that originate from ions with which the surface of the solid sample is irradiated in the ion irradiation step and have undergone a charge transfer reaction with an atom or molecule present on the surface of the solid sample; and
an information calculation step of obtaining information on electrical properties or physical properties on the surface of the solid sample on a basis of an observation result of the scattered ions in the observation step.

2. The surface analysis method according to claim 1, wherein information on electrical properties or physical properties on the surface of the solid sample is at least one of double ionization energy, surface potential, work function, or spin state of electrons.

3. The surface analysis method according to claim 1, wherein the specific ion species are protons, and in the observation step, negative hydrogen ions scattered after undergoing charge inversion on the surface of the solid sample are observed.

4. The surface analysis method according to claim 1, wherein an ion stream and/or the solid sample is moved such that an irradiation position of the ion stream on the surface of the solid sample is two-dimensionally scanned on the surface, and in the information calculation step, mapping of information on the surface of the solid sample is performed using the information obtained along with the movement.

5. The surface analysis method according to claim 1, wherein in the ion irradiation step, an incident angle of an ion stream to the surface of the solid sample is changed, and in the observation step, a scattering angle of ions to be observed is changed, whereby scattered ions are allowed to be observed without accompanying the charge transfer reaction.

6. The surface analysis method according to claim 1, wherein in a state where a voltage is applied to the solid sample, information on electrical properties or physical properties on the surface of the solid sample are acquired by the ion irradiation step, the observation step, and the information calculation step.

7. The surface analysis method according to claim 1, wherein a state of the solid sample is changed by an action from outside, and in the information calculation step, information according to a difference in presence or absence of a state change of the solid sample is acquired.

8. The surface analysis method according to claim 1, wherein an ion stream that hits the surface of the solid sample is spatially narrowed down, and information on a minute region on the surface of the solid sample is acquired.

9. The surface analysis method according to claim 1, wherein in the ion irradiation step, the surface of the solid sample is intermittently irradiated with an ion stream, and in the observation step, scattered ions are observed corresponding to a period during the ion stream irradiation.

10. A surface analysis apparatus comprising:
an ion irradiation unit configured to irradiate a surface of a solid sample with an ion stream of a specific ion species having a preset value of kinetic energy at a predetermined incident angle;
an observation unit configured to observe scattered ions that originate from ions with which the surface of the solid sample is irradiated by the ion irradiation unit and have undergone a charge transfer reaction with an atom or molecule present on the surface of the solid sample; and
an information calculation unit configured to obtain information on electrical properties or physical properties on the surface of the solid sample on a basis of an observation result of the scattered ions in the observation unit.

11. The surface analysis apparatus according to claim 10, wherein the information calculation unit is configured to obtain at least one of double ionization energy, surface potential, work function, or spin state of electrons as the information.

12. The surface analysis apparatus according to claim 10, wherein the specific ion species are protons, and the observation unit is configured to observe negative hydrogen ions scattered after undergoing charge inversion on the surface of the solid sample.

13. The surface analysis apparatus according to claim 10, further comprising a scanning unit configured to move an ion stream and/or a solid sample such that an irradiation position of the ion stream on the surface of the solid sample is two-dimensionally scanned on the surface, wherein the information calculation unit is configured to map information on the surface of the solid sample using information obtained with the movement of the ion stream and/or the solid sample by the scanning unit.

14. The surface analysis apparatus according to claim 10, wherein the ion irradiation unit is configured to allow change of an incident angle of an ion stream with respect to the solid sample, and the observation unit is configured to allow change of a scattering angle of an ion to be observed.

15. The surface analysis apparatus according to claim 10, further comprising a voltage application unit configured to apply a voltage to the solid sample.

16. The surface analysis apparatus according to claim 10, further comprising a change occurrence unit configured to change a state of the solid sample by an action from outside, wherein the information calculation unit is configured to acquire information according to a difference in presence or absence of a state change of the solid sample by the change occurrence unit.

17. The surface analysis apparatus according to claim 10, wherein the ion irradiation unit includes a narrowing unit configured to spatially narrow an ion stream that hits the surface of the solid sample.

18. The surface analysis apparatus according to claim 10, wherein the ion irradiation unit is configured to allow intermittent emission of the ion stream.

* * * * *